(12) United States Patent
Sprenger

(10) Patent No.: US 11,250,609 B1
(45) Date of Patent: Feb. 15, 2022

(54) METHOD FOR CONTROLLING DIGITAL FEATHER GROWTH BETWEEN TWO MANIFOLDS IN A COMPUTER SIMULATED CREATURE

(71) Applicant: Weta Digital Limited, Wellington (NZ)

(72) Inventor: Christoph Sprenger, Wellington (NZ)

(73) Assignee: Weta Digital Limited, Wellington (NZ)

( * ) Notice: Subject to any disclaimer, the term of this patent is extended or adjusted under 35 U.S.C. 154(b) by 0 days.

(21) Appl. No.: 17/320,959

(22) Filed: May 14, 2021

(51) Int. Cl.
  *G06T 13/40* (2011.01)
  *G06T 15/04* (2011.01)
(52) U.S. Cl.
  CPC .............. *G06T 13/40* (2013.01); *G06T 15/04* (2013.01)
(58) Field of Classification Search
  CPC ........... G06T 13/40; G06T 15/04; G06T 7/00; G06T 15/506; G06Q 30/02; G06N 3/004; G06N 20/00; H04L 67/306; H04L 67/22; G06O 30/0269; G06F 16/9535
  See application file for complete search history.

(56) References Cited

U.S. PATENT DOCUMENTS

| | | | | |
|---|---|---|---|---|
| 5,379,225 A | * | 1/1995 | Tazawa | G06F 30/23 700/98 |
| 5,586,230 A | * | 12/1996 | Leon | G06T 17/10 345/420 |
| 11,055,892 B1 | * | 7/2021 | Choi | G06K 9/627 |
| 2012/0230566 A1 | * | 9/2012 | Dean | G05B 19/4099 382/131 |

* cited by examiner

*Primary Examiner* — Abderrahim Merouan
(74) *Attorney, Agent, or Firm* — Haynes and Boone, LLP

(57) ABSTRACT

A realistic feather growth may be represented between two surface manifolds in a modeling system. To perform the feather growth, a feather groom for a plurality of feathers between an inner shell of a creature and an outer shell of the creature is received. An inner manifold for the inner shell and an outer manifold for the outer shell is determined with a plurality of follicle points and a plurality of tip points. A first surface contour definition for the inner manifold and a second surface contour definition for the outer manifold is determined and used to determine a volumetric vector field between the inner manifold and the outer manifold. Thereafter, the plurality of feathers is generated between the inner manifold and the outer manifold using the follicle points, the tip points, and the volumetric vector fields.

20 Claims, 5 Drawing Sheets

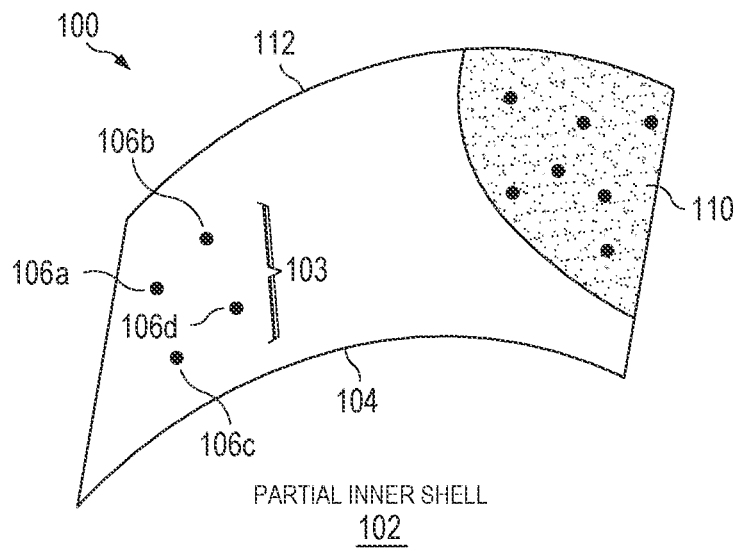
FIG. 1
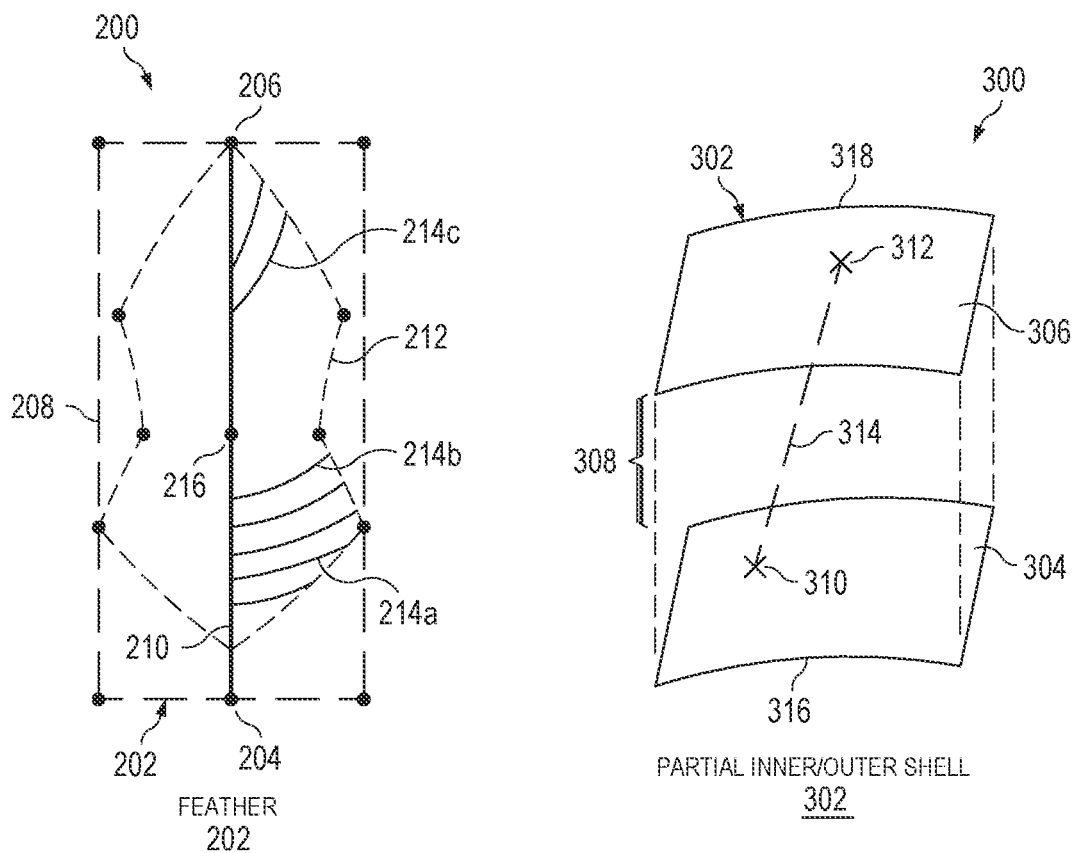
FIG. 2
FIG. 3

METHOD FOR CONTROLLING DIGITAL FEATHER GROWTH BETWEEN TWO MANIFOLDS IN A COMPUTER SIMULATED CREATURE

FIELD OF THE INVENTION

The present disclosure generally relates to computer animation and tools for specifying objects in a virtual scene from which computer-generated imagery is to be generated and more particularly to a tool for specifying procedurally-generated plumage objects.

BACKGROUND

In computer-generated image generation and animation, of images and/or video sequences, there might be a desire to place and animate particular objects. In a detailed virtual scene, it could be tedious to individually place each desired object into the virtual scene. Furthermore, if each desired object is placed manually, later revisions of the scene might also be tedious to modify, as it might require an animation artist to move a large number of items, such as individual feathers on a bird-like creature while having a visually pleasing result. Objects that comprise plumage or the like on a shell or surface of a creature (e.g., a person, character, animal, imaginary or fictional creature, and the like), can comprise a large number of individual objects. For example, a creature may have features on their surface including feathers, hairs, fur, and the like, which may extend outward from the surface.

For simple cartoons, for example, this might not be difficult. However, as viewers have come to expect more complex visuals, there is a need for a procedural placement of the objects in a realistic fashion, which can be driven by a computer process instead of requiring an artist to manage each object manually. Some of that computer-driven creature generation might rely on simulation and models to perform more realistic creature generation, movement, and animation.

SUMMARY

According to some embodiments, a computer-implemented method for realistic feather growth between two surface manifolds in a three-dimensional (3D) animation system may include, under the control of one or more computer systems configured with executable instructions, receiving a feather groom for a plurality of feathers between an inner shell of a creature and an outer shell of the creature, determining an inner manifold for the inner shell and an outer manifold for the outer shell, determining a first surface contour definition for the inner manifold and a second surface contour definition for the outer manifold, determining volumetric vector field between the inner manifold and the outer manifold using the first surface contour definition and the second surface contour definition, and generating the plurality of feathers between the inner manifold and the outer manifold using the follicle points, the tip points, and the volumetric vector fields. The inner manifold may a plurality of follicle points for placement of bases of the plurality of feathers, and the outer manifold may include a plurality of tip points for corresponding tips of the plurality of feathers associated with the bases.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the feather and surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 1 illustrates an environment where an inner manifold for an internal shell of a three-dimensional (3D) creature may have follicles arranged for placement of feathers or other external objects protruding from the inner manifold, in an embodiment.

FIG. 2 illustrates an environment where a computer-generated feather may be shown and grown from an inner manifold to an outer manifold for two shells of a 3D creature, in an embodiment.

FIG. 3 illustrates an environment where inner and outer manifolds for two shells of a 3D creature may be used for growth of feathers or other external objects, in an embodiment.

DETAILED DESCRIPTION

Figure 4:
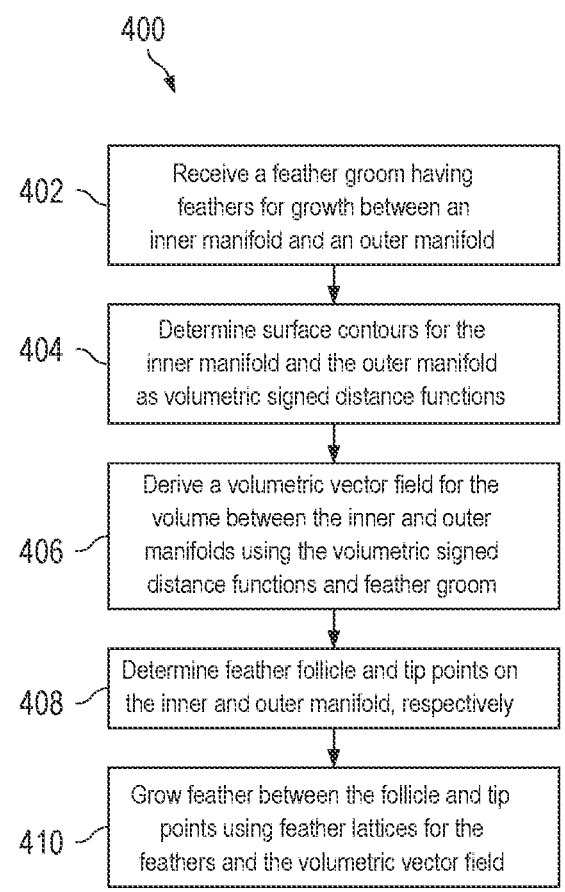
FIG. 4 is a flowchart of an exemplary method as might be performed by computing system when modeling a 3D image and/or animation of a creature having feathers or other external objects on a surface, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer simulation that is used for creature generation may be used to animate creatures and natural movements of the creatures, such as by using a physics engine to output animations and movements of an articulated creature that are consistent with real-world physics and joint constraints. This may be done through one or more algorithms that attempt to automate this process of animating surfaces, body parts, and the like. For example, computer simulation and animation may be used to animate objects on a surface of a character by taking one or a subset of objects on the surface and attempting to place other similar objects on the surface through interpolations and other algorithmic approaches. In some ways, this is often a simple problem—how to determine natural-looking surfaces and surface objects of at most a few dozen attached objects on the surface. For other simulations, such as those with flexible objects, animal coats or pelts, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources.

Thus, creatures generated and animated can be created in computer-readable form procedurally or manually. For example, an image of a sphere might be generated procedurally from a user input of a center location, a radius parameter, and a color. In another example, a more complex object might be generated procedurally from a set of parameters and a set of procedural rules for object creation. Objects might also be created manually, such as by having an artist draw into a computer system the shape of an object. In some cases, an artist might manually adjust a procedurally-generated object and place external objects on that object (e.g., feathers, hairs, fur, and the like), or may utilize algorithmic approaches with external silhouettes or shells of the creature. However, simulation computations involving objects on a surface generally look at the surface alone, and this silhouette of this surface. The simulation then attempts to place these objects across this surface, which suffers from issues when the objects form a part of the silhouette. This occurs in the real-world when underlying surfaces, internal body parts, and the like control where and how external objects are placed and form the overall silhouette of the creature, such as a feather groom or fur pelt.

Realistic feather growth for a coat or groom of a creature, such as a bird, an initial feather groom can be provided as an input to a computer animation and simulation system for three-dimensional (3D) creatures (e.g., humans, animals, fictional creatures, and the like). The feature groom includes multiple different features, such as different size, colors, and/or styles of feathers, some of which may be guide feathers used to interpolate and/or estimate the size, shape, deformations, and the like of nearby feathers (e.g., those other feathers that may be automatically generated nearby or between the guide feather(s)). Each feather may be represented by a corresponding subdivided lattice such that each feather may be embedded and deformed in the corresponding creature's animation by the feathers respective lattice. By having this procedurally generated, later revisions of a set of a large number of feathers (or other elements that might behave like feathers) can be easily generated by modifying procedural inputs and rerunning a feather generation process rather than modifying feathers individually. In some embodiments of an animation system, the feather generation process is supported and manual manipulation of individual feathers is also supported.

The feather groom is further designated for a creature having an internal surface or shell and an external surface or shell. The internal shell may correspond to an inner anatomy of the creature. For example, with a bird, this inner anatomy may correspond to the bare surface skin of the bird, which would correspond to the shape of the bird if the bird were not to have any feather (e.g., an image of the anatomy of the bird if all feathers were removed). This inner anatomy of the creature may be represented as an inner manifold, or a topological surface. In contrast, the external shell of the creature corresponds to a silhouette of the creature when the corresponding external objects are on the creature, such as the feathers, hairs, fur, or the like of the creature. With a bird, the outer shell may therefore correspond to a groom, coat, or the like of feathers that protrude from the inner anatomy of a bird. Other characters, creatures, and the like may similarly have such anatomy on at least a portion of their body, such as humans with hair, dinosaurs, fantastical creatures, and the like.

Thus, the external shell may be significantly different from the internal shell due to the external objects protruding from the internal shell and causing a silhouette of the creature. This silhouette of the external shell of the user may be represented as an outer manifold of the creature. The inner manifold and the outer manifold may have surface definitions that describe the curvature, modeling, and other topological attributes of the corresponding shells of the creature (e.g., the shape of each shell).

Using the surface definitions of the inner and outer manifolds, the computer animation system may convert the surface definitions to volumetric signed distance functions. The volumetric signed distance functions determine the distance of a given point from a set of points in space, such as on the manifold. This allows for derivation of a volumetric vector field using the initial feather groom's direction and orientation of the feathers. The volumetric vector field determines the vector fields of the feathers throughout the volume between the inner and outer manifolds. The flow fields of the vectors within the volumetric vector field may be derived through implicit volume operators combined with the distance functions. Thereafter, given the manifolds and the vector fields through the volume, computer animation and simulation are used to regrow the feathers throughout the volume by attaching each feather's base to a follicle on the inner manifold, and extending the feather to one or more tip point for a tip of the feather on the outer manifold that defines the outer boundary of the creature (e.g., the silhouette of the creature).

The angles of the follicles may be controlled through providing texture maps to the manifolds, which determine the initial angle of growth from a follicle and/or angle of growth of the feather to the tip point(s). The feather may approach the outer manifold in a smooth tangential angle in order to prevent the feathers from protruding from the external shell. This allows the feather coat to appear smooth. Further, per feather constraints may be enforced during growth of the feathers to cause the feathers' shapes and sizes to be consistent with the initial feather groom. This allows for controlling and rigging the animation of the creature through movement of the outer manifold, such as to control movements of the feathers and the feather groom. Additionally, local penetrations of feathers with other feathers may be observed from feather lattice resolutions.

FIG. 1 illustrates an environment 100 where an inner manifold for an internal shell of a three-dimensional (3D) creature may have follicles arranged for placement of feathers or other external objects protruding from the inner manifold, in an embodiment. As illustrated there, environment 100 may be displayed by a computing device and computing display when animating a 3D creature, such as a human, animal, fictional creature, or the like. For example, the computing system may correspond to a computer animation and simulation system configured to animate external objects on a surface of a creature. The external objects may correspond to those objects that protrude from the surface of the creature, such as feathers, hairs, fur, and the like. This may include protruding from an underlying skin or other anatomy of the creature. Thus, shown in environment 100 is a partial inner shell 102, which may correspond to a partial skin of the creature without having the external objects, coat, accessory, pelt, or groom on the creature. In various embodiments, the animation of the creature partial shown in environment 100 corresponds to a computer animated 3D bird.

In this regard, partial inner shell 102 may correspond to a manifold 104 that designates the topological surface and attributes of partial inner shell 102 (as well as the entirety of the inner shell when represented in a computer animation of the corresponding creature). Manifold 104 may therefore include surface definitions (e.g., as mathematical models and algorithms) that allow for representation of surface contour 112 and other surface features and attributes of partial inner shell 102. Manifold 104 may therefore allow for placement of external objects across manifold 104 using the surface definitions of manifold 104, where the external objects may correspond to the growths, coverings, and/or protrusions from partial inner shell 102 of the corresponding creature (e.g., feathers, hair, fur, etc.). In order to place the external object on manifold 104, a follicle 106a, a follicle 106b, a follicle 106c, and a follicle 106d are dispersed and scattered over the surface definitions for manifold 104. For example, a feather or a hair may be attached at its base to one of follicles 106a in order to generate the feather groom, the hair, or the fur. Although follicles are described in reference to FIGS. 1-4, it is understood other nodes, points, or areas may also be utilized in the 3D animation to attach a corresponding external object.

When placing follicles 106a-d over manifold 104, a follicle arrangement 108 may be used. Follicle arrangement 108 may place follicles 106a-d in a randomized but evenly or semi-evenly distribution so that follicle arrangement 108 appears natural without clumping too many follicles (or other nodes) in a particular area and/or causing too few follicles in another area. Thus, the layout of the feathers or other external objects may appear uniform in particular areas of the creature, such as across manifold 104. By randomizing placement within one or more coordinate systems and creating an even or semi-even distribution, visible rows, columns, or other ordered layouts of follicles 106a-d may be avoided. Additionally, a texture map 110 may be applied by an artist, such as a creature artist or other animator of the corresponding creature in environment 100. Texture map 110 may designate the follicle angles for growth of feathers from their bases or to their tips on manifold 104.

For example, texture map 110 may control the angle at which a feather is grown from its base connected to a follicle on manifold 104 so that the feather may be oriented at different angles, such as more flatly and parallel to manifold 104 or more perpendicularly and protruding from manifold 104. In further embodiments, a texture map may also be provided or painted onto an outer manifold having tip points as a boundary for which a corresponding feather is to be grown towards. In such embodiments, the texture map may define the angle at which the feather approaches the outer manifold during growth, such as a tangential angle for growth of the feather from the inner manifold to the outer manifold. Additionally, per feather constraints may be applied to each feather grown from follicles 106a-d and/or based on texture map 110 for manifold 104 so that feather sizes and shapes are maintained and consistent with the initial feather groom.

FIG. 2 illustrates an environment 200 where a computer-generated feather may be shown and grown from an inner manifold to an outer manifold for two shells of a 3D creature, in an embodiment. As illustrated there, environment 200 may be displayed by a computing device and computing display when animating and growing feathers for a 3D creature, such as a human, animal, fictional creature, or the like. For example, the computing system may correspond to a computer animation and simulation system configured to grow feathers between tow manifolds representing an internal shell of a creature (e.g., a body) and an external shell of the feature (e.g., a silhouette for the creature with protruding external objects). In order to grow such feathers, a representation of a computer animation of a feather 202 is shown in environment 200, which may have features and properties within a lattice that allow for deformation of feather 202 during growth between the two manifolds.

For example, feather 202 is shown between a lattice having subdivisions in environment 200. The subdivisions allow for defining of the individual features and properties of feather 202. For example, feather 202 is shown with a base 206 at a bottom or origin of the lattice, which then extends feather 202 to tip 206 at another end of the lattice. A structure 208 is shown for the lattice, where feather 202 is generated and animated throughout structure 208. Each subdivision within the lattice of structure 208 allows for assigning different properties to feather 202, including color, shape, curvature, and the like.

Within structure 208, feather 202 may therefore include properties and features that may be animated and deformed when growing feather 202. For example, within structure 208 and the subdivisions of the corresponding lattice, a spine 210 extends from base 204 to tip 206. Spine 210 may have a curvature and other 3D configuration that has the appearance of a real-life feather. The curvature of spine 210 may depend on different subdivisions, such as being straighter at or nearby base 204 and curving more as extended toward tip 206. In this regard, a spine point 216 may define an area or locality of spine 210 where the curvature may change. This may coincide with and/or affect the look of feather 202 based on contours 212. Contours 212 define an outer shape or contour lines that make up the feather within structure 208.

In order to define contours 212, one or more barbs may extend from spine 210, such as at different points on the spine including spine point 216. In this regard, a barb 214a, a barb 214b, and a barb 214c are shown in environment 200. Each of barbs 214a-c have a specific curve, such as when an artist animates feather 202. For example, barb 214a is shown nearby base 204, where barb 214a may extend generally in a perpendicular fashion from spine 204. Thus, the curvature of barb 214a is relatively flat as compared to barbs located closer to tip 206. Thus, as barb 214b moves closer to tip 206, the curvature of barb 214b becomes more severe and extends closer to tip 206 on contours 212. As shown with barb 214c, the curvature towards tip 204 is even more severe and extends much closer to tip 204 on contours 212 as compared to the base of barb 214c on spine 210. Based on the features and properties shown in environment 200, a feather groom may be generated between two manifolds, such as extending from the manifold shown in environment 100.

FIG. 3 illustrates an environment 300 where inner and outer manifolds for two shells of a 3D creature may be used for growth of feathers or other external objects, in an embodiment. As illustrated there, environment 300 may be displayed by a computing device and computing display when animating a 3D creature having one or more external objects, such as a human, animal, fictional creature, or the like with feathers, hair, fur, or the like. For example, the computing system may correspond to a computer animation and simulation system configured to grow and animate these external objects on a surface of a creature. The external objects may protrude in a fashion so as to cause an outer silhouette of the object around an internal shell, such as skin or underlying anatomy of the creature. Shown in environment 200 is partial inner/outer shells 302, which may correspond to a partial skin and silhouette of the creature. In various embodiments, the animation of the creature partially shown in environment 300 corresponds to a computer animated 3D bird having an underlying anatomy with a corresponding feather groom as a silhouette of the bird (e.g., with feathers around the bird).

In environment 300, an initial feather groom is provided as an input to a computer animation and simulation system for the corresponding 3D bird. The feature groom may be used to interpolate feather properties for the growth of feathers between an inner manifold 304 and an outer manifold 306. Each feather may be represented by the subdivided lattice and corresponding feather structure in environment 200 of FIG. 2. In this regard, inner manifold 304 may be defined using the surface properties of the inner shell as a topological surface, while outer manifold 306 may be defined using the surface properties of the outer shell as a corresponding topological surface. Thus, inner and outer manifolds 304 and 306 may have different sizes and/or contours based on the surfaces of the corresponding shells. Inner manifold 304 and outer manifold 306 may have surface definitions that describe the curvature, modeling, and other topological attributes. Although only a portion of the manifolds for the shells is shown in environment 300, the entire manifolds may similarly be used for feather growth.

In order to provide for a feather growth between inner manifold 304 and outer manifold 306, a volumetric vector field 308 is required to be determined. In this regard, surface definitions of inner manifold 304 and outer manifold 306 may be converted to volumetric signed distance functions that may be used to determine a distance of a given point from a set in the space defined by the corresponding manifolds. The signed distance functions may be determined using inner surface contour 316 for inner manifold 304 and outer surface contour 318 for outer manifold 306. Inner surface contour 316 and outer surface contour 318 may therefore provide the shapes, contours, and other 3D properties along inner manifold 304 and outer manifold 306, respectively. Volumetric vector field 308 may then be determined from the initial groom's direction and orientation of the feathers with respect to inner manifold 304 and outer manifold 306 (e.g., using the volumetric signed distance functions with the layouts of the feathers). Volumetric vector field 308 therefore provides the vector fields and flows through the volume between inner manifold 304 and outer manifold 306. These may further be determined using volume operators with the volumetric signed distance functions.

In environment 300, a follicle 310 is displaced on inner manifold 304 and may correspond to a base point for a feather that may be embedded in inner manifold 304. Further, a tip point 312 may be assigned on outer manifold 306 that corresponds to one or more locations or points toward which the feather is grown. Using inner manifold 304 and follicle 310 with outer manifold 306 and tip point 312, a feather growth 314 is performed with the vector fields through volumetric vector field 308. A computer animation and simulation are used to regrow the feathers throughout volumetric vector field 308, for example, by attaching a feather's base to follicle 310 on inner manifold 304, and extending the feather to tip point 312 outer manifold 306. Further, texture maps on inner manifold 304 and/or outer manifold 306 may be used to control an angle of growth from follicle 310 and/or angle of growth of the feather to tip point 312. The feather may approach outer manifold 306 in a smooth tangential angle in order to prevent the feather from protruding from the outer portion/shell of partial inner/outer shells 302. Additionally, during feather growth 314, one or more feather constraints may be enforced on the sizes and shapes of the feathers to be consistent with the initial feather groom. Outer manifold 306 may then be used for controlling and rigging the animation of the creature (e.g., to control movements of the feathers and the feather groom).

FIG. 4 is a flowchart 400 of an exemplary method as might be performed by computing system when modeling a 3D image and/or animation of a creature having feathers or other external objects on a surface, in an embodiment. Note that one or more steps, processes, and methods described herein of flowchart 400 may be omitted, performed in a different sequence, or combined as desired or appropriate.

In step 402 of flowchart 400, a feather groom having feather for growth between an inner manifold and an outer manifold is received. The feather groom may have a number of feathers to be grown from follicles on an inner manifold to a boundary surface and/or tip points on an outer manifold. In this regard, the feather groom may include an orientation, direction, and/or deformation of each feather that corresponds to a vector flow of the feathers through a volumetric vector space. Therefore, each feather further includes contours that define the points and lines along a feather, such as a spine of the feather and barbs extending from the spine. The spine may further have a curvature or curl, while each barb further includes a curl spread, separation, and angle to the outer curvature of the feather.

At step 404, surface contours for the inner manifold and the outer manifold are determined as volumetric signed distance functions. The surface contours correspond to the topological features and attributes of the underlying feature mesh for the creature. Thus, these attributes may be converted to a mathematical model and/or representation that allows for defining of the inner manifold and outer manifold for use with feather placements. At step 406, a volumetric vector field for the volume between the inner and outer manifolds is derived using the volumetric signed distance functions and the feather groom. For example, the volumetric vector field may be derived to determine the direction and orientation of vector fields for the feathers between the volume based on the direction and orientation of the feathers in the feather groom and the surface definitions for the inner and outer manifolds. This allows for regrowth of the feathers through the volume in a similar fashion to the feather groom.

At step 408, feather follicle and tip points on the inner and outer manifolds, respectively, are determined. These points may correspond to an initial follicle point for embedding of each feather, which is then deformed toward the outer manifold and tip point on the outer manifold based on the volumetric vector field. Further, one or more texture maps may be implemented on the inner and/or outer manifolds in order to allow for angular growths of feathers. Thereafter, at step 410, the feathers are grown between the follicle and tip point/outer boundary as determined by the outer manifold using the feather lattices for the feathers and the volumetric vector field. During feather grown, one or more feather constraints may further be applied to the feathers to ensure that sizes and shapes of the feathers remain the same or similar to the initial feather groom. Further, the feathers may be grown to the outer manifold using a smooth tangential angle to prevent protrusion of the feather from the outer shell/manifold, which creates a smooth coat.

Figure 5:
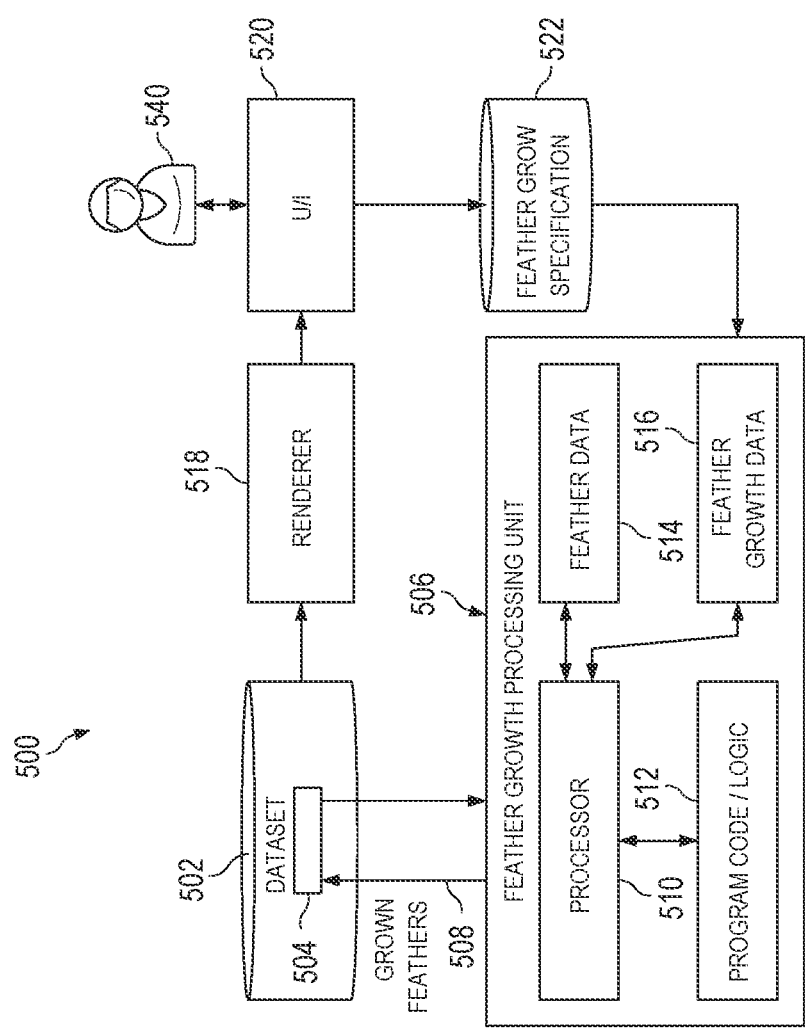
FIG. 5 is a system for controlling and simulating digital feather growth between two manifolds within a computer animation, in an embodiment.

FIG. 5 illustrates a system 500 for controlling and simulating digital feather growth between two manifolds within a computer animation, in an embodiment. The system includes a dataset 502, a feather growth processing unit 506, a renderer 518, a user interface (UI) 520, and a feather grow specification 522.

A user 540 may interact with the UI 520 to define one or more feather grooms and/or growths between two manifolds that is to be grown and/or constrained by the surfaces defining the manifolds such that feather intersections are minimized and feather grooms are grown realistically. A feather may therefore correspond to a feather lattice or other fiber defined as a data structure that is used to be placed relative to a surface or other inner manifold of a character, creature, or other object, and thereafter digital grown to an outer manifold of that object. Feather grow specification 522 may indicate, for example, the criteria for the feather lattice(s) and/or manifold(s), such as the curvature, polynomials, placement, vertices, and the like of the digital objects for the feather lattice(s) and/or manifold(s). Dataset 502 may store data for surfaces and other manifolds used to grow or constrain feathers between manifolds, such as characters, creatures, or objects defining an inner and outer manifold, as well as data to define feather lattices and other fibers. Dataset 502 may be loaded with data from a source of an animation, such as a tessellated mesh, subdivision surface, or the like used to define a character, creature, or object. Dataset 502 may also be loaded with data from a source of an animation to designate feathers and other fibers, including guide or target feathers used to grow additional feathers. Feather growth processing unit 506 may utilize the methods and processes described herein to take feather grow specification 522 and generate a feather groom according to the surfaces or manifolds utilized with the feather(s) from dataset 502. The feather growth processing unit 506 may grow the feather groom using the feather lattices or other representations, and the selected points or vertices on the manifolds to grow the feathers with the corresponding volumetric vector field derived from a flow field of the feathers between the manifolds, as described herein.

Feather growth processing unit 506 includes a processor 510 that executes program code 512 to generate a feather groom designated in feather grow specification 522 using feather data 514 from dataset 502. Feather growth processing unit 506 may further store grown feathers 508 to dataset 502 so that the corresponding manifolds and feathers or fibers represented by the feather groom may be rendered by renderer 518 for a realistic scene visualization using the feathers groom. For example, feather growth processing unit 506 may initiate the process by taking feather grow specification 522 with feather data 514 and growing digital feathers between two manifolds by feather growth data 516 so that feather data 514 follows a volumetric vector field between two manifolds and minimizes intersections between feathers. Based on feather growth data 516, feather growth processing unit 506 may then output grown feathers 508, which may include feather growth parameters 504 stored by dataset 502 as well as other required data to reproduce feather grooms by the corresponding surfaces or manifolds. Feather growth processing unit 506 may then move to the next feather growth designated by user 540 and further generate digital feather grooms by feather data 514 and additional manifolds designated by user 540. The resulting grown and/or constrained feather grooms may be rendered by rendered 518 and/or output to user 540 to inspect the results.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of digital animation, by improving the computation time to calculate and place digital feathers that appear as a realistic groom between two manifolds. (2) Additionally, techniques described and suggested in the present disclosure improve the efficiency of computing systems by, since the computation time to calculate feather grooms is reduced, to compute and render more complex and realistic models in digital animation sequences. (3) Moreover, techniques described and suggested in the present disclosure are necessarily rooted in computer technology in order to overcome problems specifically arising with how to generate feather grooms using feather lattices and volumetric vector fields to simulate realistic feathers, fibers, or other flexible objects within the computational and time constraints of producing a digital animation product.

Figure 6:
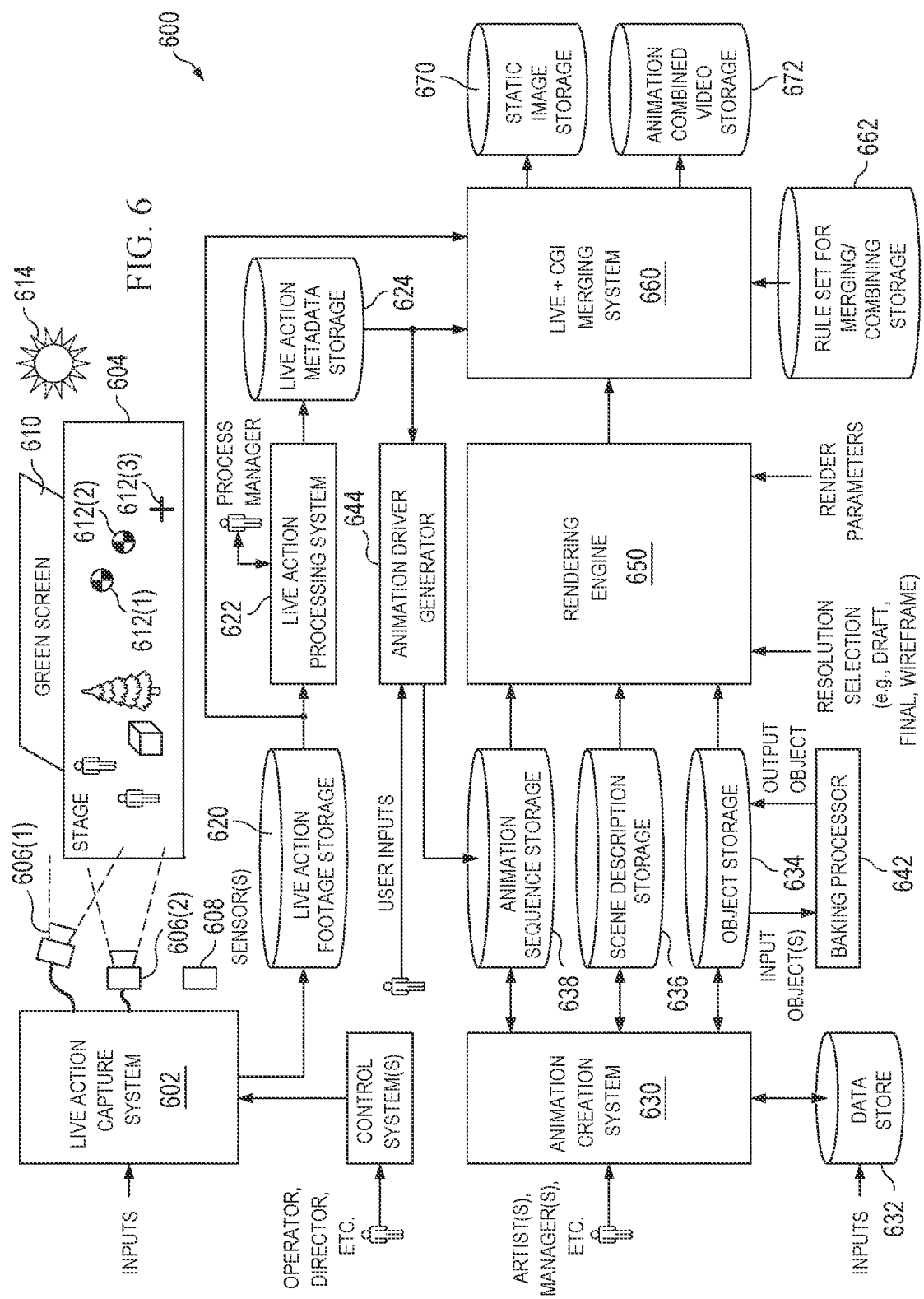
FIG. 6 illustrates an example visual content generation system as might be used to generate imagery in the form of still images and/or video sequences of images, according to various embodiments.

The visual content generation system 600 (see FIG. 6) is configured to receive the values for creature generation and animation in environments 100, 200, and 300 as input and output one or more static images and/or one or more animated videos. The static image(s) and/or the animated video(s) include one or more visual representations of a creature having a feather groom, hide, pelt, hair, coat, or the like. For example, FIG. 6 illustrates the example visual content generation system 600 as might be used to generate imagery in the form of still images and/or video sequences of images. The visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist, such as a creature artist generating and animating the creature's manifolds and corresponding external objects in environments 100, 200, and 300, and might use the visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, a creature artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. The live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On the stage 604, there might be human actors, animal actors, inanimate objects, background objects, and possibly an object such as a green screen 610 that is designed to be captured in a live scene recording in such a way that it is easily overlaid with computer-generated imagery. The stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, the live action capture system 602 might output live action footage to a live action footage storage 620. A live action processing system 622 might process live action footage to generate data about that live action footage and store that data into a live action metadata storage 624. The live action processing system 622 might include computer processing capabilities, image processing capabilities, one or more processors, program code storage for storing program instructions executable by the one or more processors, as well as user input devices and user output devices, not all of which are shown. The live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of the overhead light 614, as that might be useful in post-processing to match computer-generated lighting on objects that are computer-generated and overlaid on the live action footage. The live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of the visual content generation system 600. The animation creation system 630 might include computer processing capabilities, image processing capabilities, one or more processors, program code storage for storing program instructions executable by the one or more processors, as well as user input devices and user output devices, not all of which are shown. The animation creation system 630 might be used by animation artists, managers, and others to specify details, perhaps programmatically and/or interactively, of imagery to be generated. From user input and data from a database or other data source, indicated as a data store 632, the animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to the object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from the data store 632 might be used to drive object presentation. For example, if an artist is creating an animation of a spaceship passing over the surface of the Earth, instead of manually drawing or specifying a coastline, the artist might specify that the animation creation system 630 is to read data from the data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. The animation driver generator 644 might generate corresponding animation parameters to be stored in the animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 622. The animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. The rendering engine 650 might include computer processing capabilities, image processing capabilities, one or more processors, program code storage for storing program instructions executable by the one or more processors, as well as user input devices and user output devices, not all of which are shown.

The visual content generation system 600 can also include a merging system 660 that merges live footage with animated content. The live footage might be obtained and input by reading from the live action footage storage 620 to obtain live action footage, by reading from the live action metadata storage 624 to obtain details such as presumed segmentation in captured images segmenting objects in a live action scene from their background (perhaps aided by the fact that the green screen 610 was part of the live action scene), and by obtaining CGI imagery from the rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from the rendering engine 650, and output an image where each pixel is a corresponding pixel from the rendering engine 650 when the corresponding pixel in the live footage is a specific color of green, otherwise output a pixel value from the corresponding pixel in the live footage."

The merging system 660 might include computer processing capabilities, image processing capabilities, one or more processors, program code storage for storing program instructions executable by the one or more processors, as well as user input devices and user output devices, not all of which are shown. The merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 660, such as modifying boundaries of segmented objects, inserting blurs to smooth out imperfections, or adding other effects. Based on its inputs, the merging system 660 can output an image to be stored in a static image storage 670 and/or a sequence of images in the form of video to be stored in an animated/combined video storage 672.

Thus, as described, the visual content generation system 600 can be used to generate video that combines live action with computer-generated animation using various components and tools, some of which are described in more detail herein. While the visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
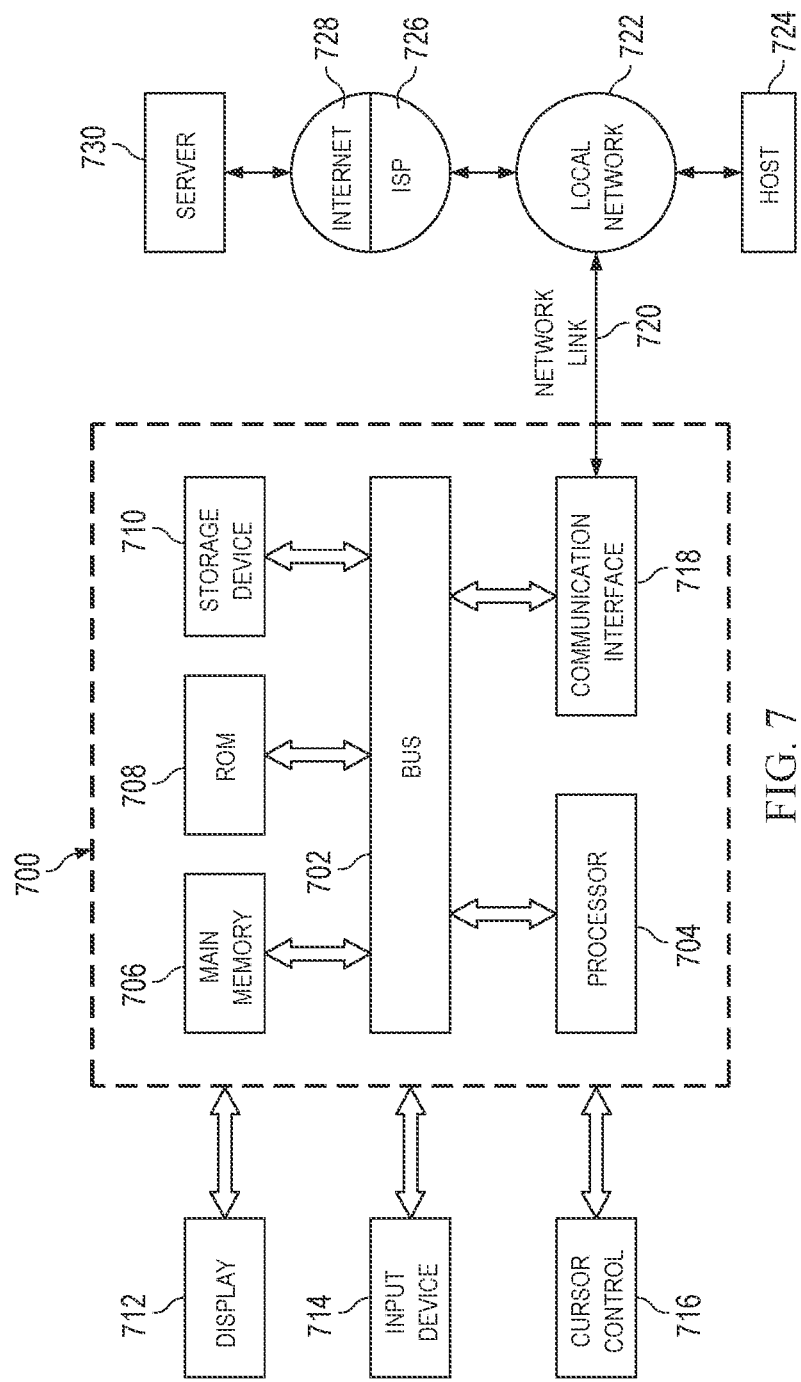
FIG. 7 is a block diagram illustrating an example computer system upon which computer systems of the systems illustrated in FIGS. 1 and 6 may be implemented.

For example, FIG. 7 is a block diagram that illustrates a computer system 700 upon which the computer systems of the systems described herein and/or the visual content generation system 600 (see FIG. 6) may be implemented. The computer system 700 includes a bus 702 or other communication mechanism for communicating information, and a processor 704 coupled with the bus 702 for processing information. The processor 704 may be, for example, a general-purpose microprocessor.

The computer system 700 also includes a main memory 706, such as a random-access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704. Such instructions, when stored in non-transitory storage media accessible to the processor 704, render the computer system 700 into a special-purpose machine that is customized to perform the operations specified in the instructions.

The computer system 700 further includes a read only memory (ROM) 708 or other static storage device coupled to the bus 702 for storing static information and instructions for the processor 704. A storage device 710, such as a magnetic disk or optical disk, is provided and coupled to the bus 702 for storing information and instructions.

The computer system 700 may be coupled via the bus 702 to a display 712, such as a computer monitor, for displaying information to a computer user. An input device 714, including alphanumeric and other keys, is coupled to the bus 702 for communicating information and command selections to the processor 704. Another type of user input device is a cursor control 716, such as a mouse, a trackball, or cursor direction keys for communicating direction information and command selections to the processor 704 and for controlling cursor movement on the display 712. This input device typically has two degrees of freedom in two axes, a first axis (e.g., x) and a second axis (e.g., y), that allows the device to specify positions in a plane.

The computer system 700 may implement the techniques described herein using customized hard-wired logic, one or more ASICs or FPGAs, firmware and/or program logic which in combination with the computer system causes or programs the computer system 700 to be a special-purpose machine. According to one embodiment, the techniques herein are performed by the computer system 700 in response to the processor 704 executing one or more sequences of one or more instructions contained in the main memory 706. Such instructions may be read into the main memory 706 from another storage medium, such as the storage device 710. Execution of the sequences of instructions contained in the main memory 706 causes the processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 710. Volatile media includes dynamic memory, such as the main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 702. Transmission media can also take the form of acoustic or light waves, such as those generated during radio-wave and infra-red data communications.

Various forms of media may be involved in carrying one or more sequences of one or more instructions to the processor 704 for execution. For example, the instructions may initially be carried on a magnetic disk or solid-state drive of a remote computer. The remote computer can load the instructions into its dynamic memory and send the instructions over a network connection. A modem or network interface local to the computer system 700 can receive the data. The bus 702 carries the data to the main memory 706, from which the processor 704 retrieves and executes the instructions. The instructions received by the main memory 706 may optionally be stored on the storage device 710 either before or after execution by the processor 704.

The computer system 700 also includes a communication interface 718 coupled to the bus 702. The communication interface 718 provides a two-way data communication coupling to a network link 720 that is connected to a local network 722. For example, the communication interface 718 may be a network card, a modem, a cable modem, or a satellite modem to provide a data communication connection to a corresponding type of telephone line or communications line. Wireless links may also be implemented. In any such implementation, the communication interface 718 sends and receives electrical, electromagnetic, or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP) 726. The ISP 726 in turn provides data communication services through the world-wide packet data communication network now commonly referred to as the "Internet" 728. The local network 722 and Internet 728 both use electrical, electromagnetic, or optical signals that carry digital data streams. The signals through the various networks and the signals on the network link 720 and through the communication interface 718, which carry the digital data to and from the computer system 700, are example forms of transmission media.

The computer system 700 can send messages and receive data, including program code, through the network(s), the network link 720, and communication interface 718. In the Internet example, a server 730 might transmit a requested code for an application program through the Internet 728, ISP 726, local network 722, and communication interface 718. The received code may be executed by the processor 704 as it is received, and/or stored in the storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for realistic feather growth between two surface manifolds in a modeling system, the method comprising:
    under the control of one or more computer systems configured with executable instructions:
        receiving a feather groom for a plurality of feathers between an inner shell of a creature and an outer shell of the creature;
        determining an inner manifold for the inner shell and an outer manifold for the outer shell, wherein the inner manifold comprises a plurality of follicle points for placement of bases of the plurality of feathers, and wherein the outer manifold comprises a plurality of tip points for corresponding tips of the plurality of feathers associated with the bases;
        determining a first surface contour definition for the inner manifold and a second surface contour definition for the outer manifold;
        determining volumetric vector field between the inner manifold and the outer manifold using the first surface contour definition and the second surface contour definition; and
        generating the plurality of feathers between the inner manifold and the outer manifold using the follicle points, the tip points, and the volumetric vector fields.

2. The computer-implemented method of claim 1, further comprising:
    determining a corresponding subdivided lattice for each of the plurality of feathers, wherein the corresponding subdivided lattice comprises a plurality of properties for each of the plurality of feathers,
    wherein each of the plurality of feathers are further generated between the inner manifold and the outer manifold using the corresponding subdivided lattice to embed and deform each of the plurality of feathers.

3. The computer-implemented method of claim 1, wherein the inner shell of the creature comprises an inner skin anatomy of the creature without corresponding creature features, and wherein the outer shell of the creature comprises an outer silhouette of the creature having the corresponding creature features.

4. The computer-implemented method of claim 1, further comprising:
receiving a movement of the outer manifold; and
adjusting the feather groom using the movement of the outer manifold, the inner manifold, and the volumetric vector field.

5. The computer-implemented method of claim 1, wherein prior to generating the plurality of feathers, the method further comprises:
receiving a texture map on one of the inner manifold or the outer manifold for a feather texture of the feather groom; and
determining follicle angles of the follicle points using the texture map,
wherein generating the plurality of feathers further uses the follicle angles.

6. The computer-implemented method of claim 1, wherein the plurality of feathers is generated to approach the outer manifold using one or more smooth tangential angles, and wherein the one or more smooth tangential angles are selected to avoid protrusion of the plurality of feathers from the outer manifold or appear smooth on the outer manifold.

7. The computer-implemented method of claim 1, wherein generating the plurality of feathers further comprises:
enforcing one or more feather constraints on the plurality of feathers during generating the plurality of feathers between the inner manifold and the outer manifold.

8. The computer-implemented method of claim 1, wherein determining the first surface contour definition for the inner manifold and the second surface contour definition for the outer manifold comprises:
converting surface definitions of the inner manifold and the outer manifold to volumetric signed distance functions for a determination of the volumetric vector field.

9. A system comprising: at least one processor, and a storage medium storing instructions, which when executed by the at least one processor, cause the system to implement the computer-implemented method of claim 1.

10. A non-transitory computer-readable storage medium storing instructions, which when executed by at least one processor of a computer system, causes the computer system to carry out the computer-implemented method of claim 1.

11. A non-transitory computer-readable medium carrying instructions, which when executed by at least one processor of a computer system, causes the computer system to carry out the computer-implemented method of claim 1.

12. A non-transitory carrier medium carrying image data that includes pixel information generated according to the computer-implemented method of claim 1.

13. A computer system for realistic feather growth between two surface manifolds in a modeling system, the computer system comprising:
at least one processor; and
a computer-readable medium storing instructions, which when executed by the at least one processor, causes the computer system to perform operations comprising:
receiving a feather groom for a plurality of feathers between an inner shell of a creature and an outer shell of the creature;
determining an inner manifold for the inner shell and an outer manifold for the outer shell, wherein the inner manifold comprises a plurality of follicle points for placement of bases of the plurality of feathers, and wherein the outer manifold comprises a plurality of tip points for corresponding tips of the plurality of feathers associated with the bases;
determining a first surface contour definition for the inner manifold and a second surface contour definition for the outer manifold;
determining volumetric vector field between the inner manifold and the outer manifold using the first surface contour definition and the second surface contour definition; and
generating the plurality of feathers between the inner manifold and the outer manifold using the follicle points, the tip points, and the volumetric vector fields.

14. The computer system of claim 13, wherein the operations further comprise:
determining a corresponding subdivided lattice for each of the plurality of feathers, wherein the corresponding subdivided lattice comprises a plurality of properties for each of the plurality of feathers,
wherein each of the plurality of feathers are further generated between the inner manifold and the outer manifold using the corresponding subdivided lattice to embed and deform each of the plurality of feathers.

15. The computer system of claim 13, wherein the inner shell of the creature comprises an inner skin anatomy of the creature without corresponding creature features, and wherein the outer shell of the creature comprises an outer silhouette of the creature having the corresponding creature features.

16. The computer system of claim 13, wherein the operations further comprise:
receiving a movement of the outer manifold; and
adjusting the feather groom using the movement of the outer manifold, the inner manifold, and the volumetric vector field.

17. The computer system of claim 13, wherein prior to generating the plurality of feathers, the operations further comprise:
receiving a texture map on one of the inner manifold or the outer manifold for a feather texture of the feather groom; and
determining follicle angles of the follicle points using the texture map,
wherein generating the plurality of feathers further uses the follicle angles.

18. The computer system of claim 13, wherein the plurality of feathers is generated to approach the outer manifold using one or more smooth tangential angles, and wherein the one or more smooth tangential angles are selected to avoid protrusion of the plurality of feathers from the outer manifold or appear smooth on the outer manifold.

19. The computer system of claim 13, wherein generating the plurality of feathers further comprises:
enforcing one or more feather constraints on the plurality of feathers during generating the plurality of feathers between the inner manifold and the outer manifold.

20. The computer system of claim 13, wherein determining the first surface contour definition for the inner manifold and the second surface contour definition for the outer manifold comprises:
converting surface definitions of the inner manifold and the outer manifold to volumetric signed distance functions for a determination of the volumetric vector field.

* * * * *